United States Patent [19]

Kirschensteiner et al.

[11] Patent Number: 4,667,124
[45] Date of Patent: May 19, 1987

[54] WEDGE REMOVAL SAW APPARATUS FOR A DYNAMOELECTRIC MACHINE

[75] Inventors: Fred Kirschensteiner, Forest Hills Boro; Dale T. Wiersema, Bellevue, both of Pa.

[73] Assignee: Westinghouse Electric Corp., Pittsburgh, Pa.

[21] Appl. No.: 785,810

[22] Filed: Oct. 9, 1985

[51] Int. Cl.⁴ .................. B27B 9/04; H02K 15/02
[52] U.S. Cl. ..................... 310/214; 83/471; 409/176
[58] Field of Search .......... 29/720, 721; 83/471.3, 83/486.1, 574, 745; 310/214, 216; 409/176, 177

[56] References Cited
U.S. PATENT DOCUMENTS

| | | | |
|---|---|---|---|
| 1,095,032 | 4/1914 | Sagar | 409/176 |
| 1,116,158 | 11/1914 | Swain et al. | 409/176 |
| 2,918,851 | 12/1959 | Rhindress | 409/176 |
| 3,009,073 | 11/1961 | Drabik | 310/214 |
| 3,354,784 | 11/1967 | Zemberry | 409/177 |
| 3,802,067 | 4/1974 | Davis | 310/214 |
| 4,602,435 | 7/1986 | Nishioka | 83/745 |

Primary Examiner—Patrick R. Salce
Assistant Examiner—D. L. Rebsch
Attorney, Agent, or Firm—R. S. Lombard

[57] ABSTRACT

A saw apparatus for removing the wedges maintaining the winding coils in the slots of a generator, such as a hydroelectric generator, clamps to the grooves of the slot next to the slot containing the wedges to be removed. The apparatus includes a circular power saw for sawing the wedges in half, reducing the time required for the rewinding operation.

7 Claims, 19 Drawing Figures

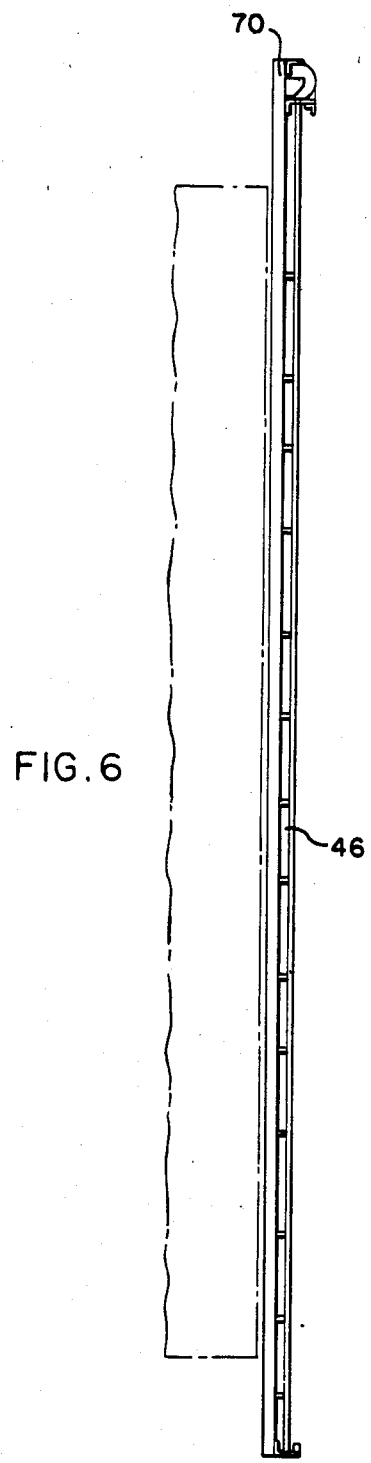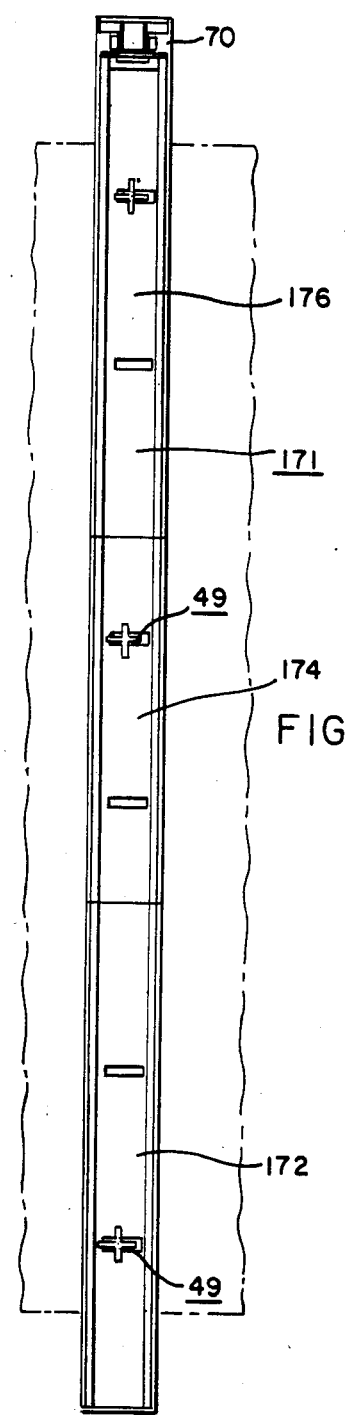
FIG. 6
FIG. 7

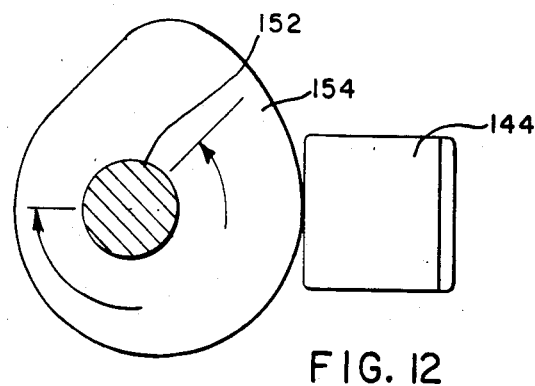
FIG. 12
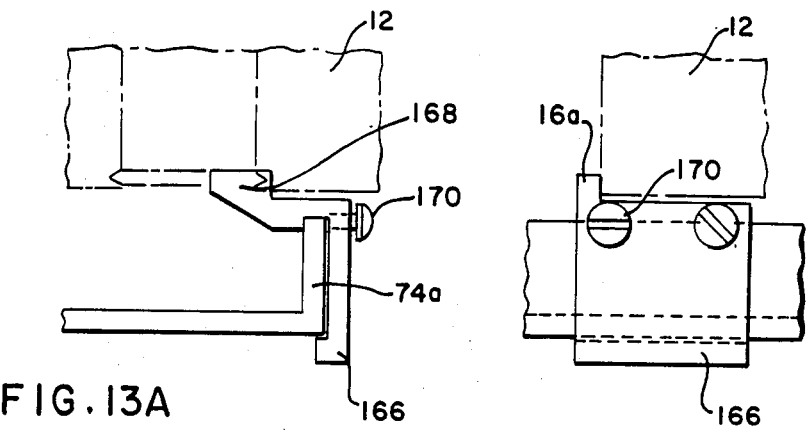
FIG. 13A
FIG. 13B

WEDGE REMOVAL SAW APPARATUS FOR A DYNAMOELECTRIC MACHINE

BACKGROUND OF THE INVENTION

This invention relates generally to dynamoelectric machines, such as a hydroelectric generator, and in particular to an apparatus for removing the non-metallic wedges placed in the grooves on opposite sides of each slot in the stator core. Typically, these wedges are made of material consisting of cellulosic or other fibers impregnated with resin such as Micarta, a trademark of the present assignee, and are approximately six inches in length. The current practice of removing these wedges involves the use of a hammer and a special driving tool and pounding each wedge out of the grooves. The length of the grooves range anywhere from 36 inches to 120 inches and contain from 6 wedges to 20 wedges. It is obvious that the current method of removing wedges is time consuming and laborious.

SUMMARY OF THE INVENTION

The present invention greatly decreases the time involved and the labor involved in removing the wedges. The present invention provides a wedge removal saw apparatus for a dynamoelectric generator. The generator typically comprises a stator core including a plurality of thin metallic laminations stacked to form the core. The stator core has a plurality of slots therethrough spaced at equal intervals around the inner diameter of the core. Winding coils are positioned in the slots. Each of the slots at one end thereof proximate the inner diameter of the stator core form an air gap for magnetic flux as is known in the art. The stator core along opposite sides of each of the slots proximate the air gap end have a groove of predetermined shape positioned a predetermined distance from the air gap end of each of the slots. A plurality of relatively thin non-metallic wedges are engagable in the grooves for maintaining the winding coils in position in the slots.

The apparatus includes circular power saw means for sawing each of the non-metallic wedges into a plurality of sections. The circular saw means includes base member means. The circular saw means includes a circular saw blade and motor means. A guide means is included for supporting and guiding the circular saw blade along the wedge means. The guide comprises guide rod means, support means for supporting the guide rod, clamp means for clamping the support means to the stator core grooves. The base member means rides on the guide rod means.

The apparatus preferably includes spring means for counter balancing the weight of the saw means during cutting of the wedge means. The spring means is mounted on the guide means and engages the saw means. Power supply means is included for providing power to the motor means, whereby the guide means is positioned such that the clamp means may engage the stator core grooves in one of the slots next to another of the slots containing the wedge means to be sawed. The saw means is energized and the wedge means is sawed. The plurality of wedge sections are removed from the grooves of the other slot.

Preferably, the circular saw means further comprises a first shaft for supporting the saw blade and a motor means is affixed to the base member for driving the saw blade. A shroud means is also desirably included substantially enclosing the saw blade. The shroud means preferably has a first opening therethrough in predetermined position, a vacuum port means is affixed to the shroud means at the first opening.

The support means preferably comprises channel member means of predetermined size and shape. The channel member means has a central member and lip members positioned on opposite sides thereof forming a channel of predetermined depth on the bottom portion of the channel member. A clamp means is included comprising a groove engaging means housed substantially within the channel of the channel members. The groove engagement means includes a fixed groove engagement member mounted to the channel member means proximate one of the lip members. The fixed groove engagement member has a pair of first groove engagement jaws. Each of the first jaws are shaped to engage a first of the grooves on one of the opposite sides of one of the slots. The pair of first groove engagement jaws are positioned a predetermined distance from the saw blade so as to engage the first groove of one of the slots adjacent to the slot containing a wedge means to be sawed.

Preferably, the channel member means include second and third openings therethrough in predetermined position and of predetermined size and shape. The groove engagement means preferably further includes a movable groove engagement member. The movable groove engagement member comprises a central holding member substantially housed within said channel members and in predetermined alignment with the second opening. A first adjustment bolt member for adjusting the position of the movable groove engagement member is included for adjusting the movable groove engagement member for various sizes of the slots.

Preferably, one of the lip members of the channel member means has a first aperture therethrough in predetermined alignment with the central holding member. The central holding member has a second aperture therethrough of predetermined size. The central holding member around the periphery of the second aperture has first threading means. The first adjustable bolt member passes through the first aperture of the lip member and engages the first threading means of the central holding member. The central holding member has first flange members affixed to opposite sides thereof. Each of the first flange members are provided with a third aperture therethrough. The first flange members around the periphery of the third aperture have second threading means. Set screw means are provided for engaging the first flange members. The set screws pass through the third opening in the central member of the channel member and engage the second threading means of the first flange members. Preferably, the central holding member has second flange members affixed thereto. The second flange members are affixed to opposite sides of the central holding member. The second flange members have fourth apertures therethrough. The fourth apertures are coaxially aligned.

Preferably, the movable grooved engagement member further comprises quick release means including a second groove engagement jaw member having a second groove engagement jaw position of predetermined size and shape to engage a second of the grooves on the other of the opposite sides of the one slot. The second jaw member has a fifth aperture therethrough in predetermined position. A second shaft member passes through the fifth aperture of the second jaw member and the fourth apertures of the second flange members. The second jaw member is rotatably mounted on the second shaft member. The second jaw member has a top cam engagement portion at the end opposite the second groove engagement jaw portion. The top cam engagement portion passes through the second opening of the central member of the channel member. The central holding member has a sixth aperture therethrough near the top thereof. A third shaft member passes through the second opening in the central member and is rotatably mounted in the sixth aperture. A cam means is affixed to the fourth shaft above the central member. The cam engagement portion of the second jaw member engages the cam. A knob member is affixed to the top of the fourth shaft. The central member has a seventh aperture therethrough proximate the bottom portion thereof. A second spring means is mounted in the seventh aperture. The second spring means engages the second jaw member proximate the second groove engagement portion thereof, whereby the knob may be turned and when the knob is turned, the clamp means quickly releases from the grooves of the stator core.

Preferably the apparatus further comprises an adjustable top-of-core stop member affixed to the support member. Preferably, the channel member means includes a plurality of interconnecting channel members. The interconnecting channel members preferably include a bottom section channel member, a middle section channel member and a top section channel member. Preferably, the clamp means is mounted to the bottom channel member and the top channel member in predetermined position. Other embodiments are also disclosed.

BRIEF DESCRIPTION OF THE DRAWINGS

For a better understanding of the invention, reference may be had to the accompanying drawings, in which:

FIG. 6 is a side elevational view of the guide means;

FIG. 7 is a front elevational view of the guide means;

FIG. 12 is a schematic plan view of the cam means;

FIG. 13A is a plan view of the cam means;

FIG. 13B is a side elevational view of the top of core stop member;

BRIEF DESCRIPTION OF THE PREFERRED EMBODIMENTS

Figure 2:
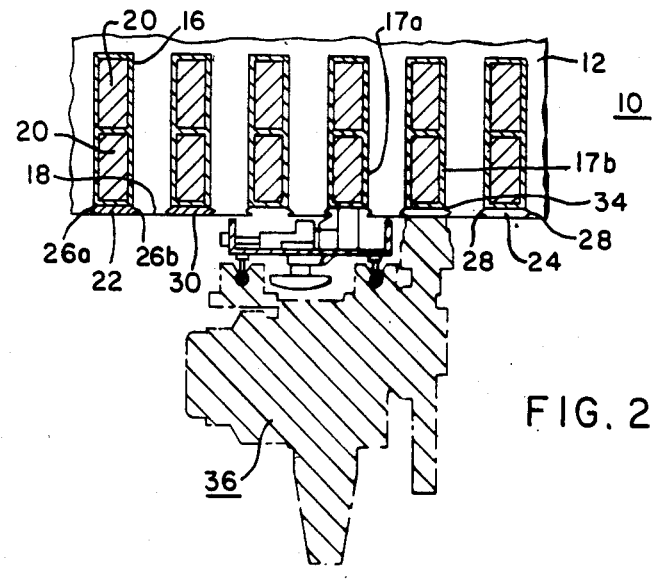
FIG. 2 is a plan view of the portion of the stator core shown in FIG. 1.
Figure 1:
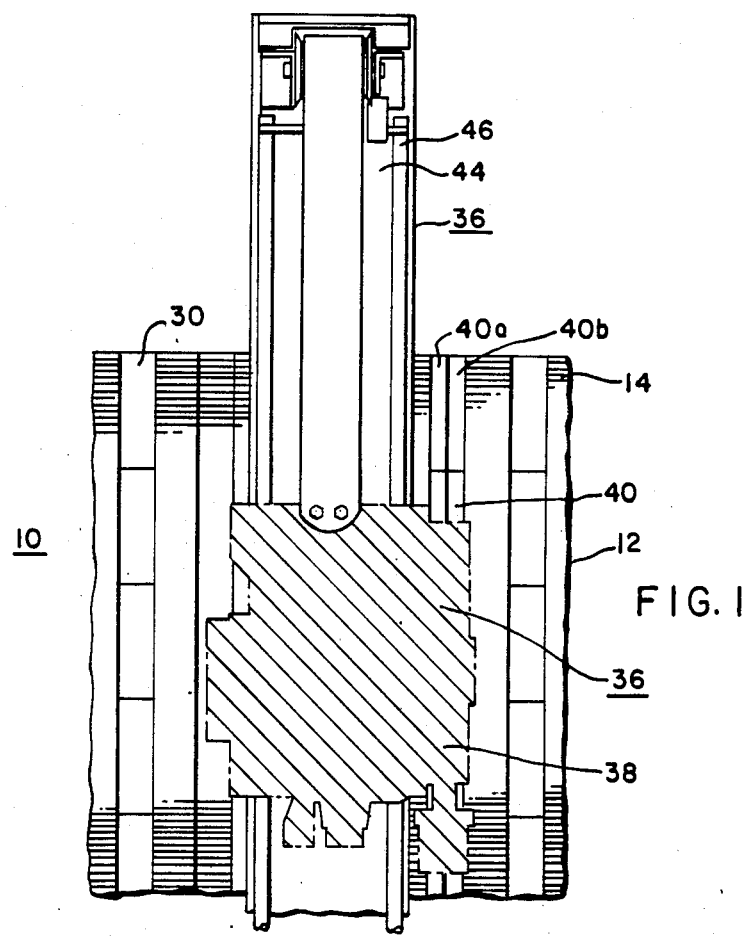
FIG. 1 is a front elevational view of a portion of the stator core of a dynamoelectric generator showing the wedge removal saw of the present invention in position to saw the wedges.

Referring to FIGS. 1 and 2, there is shown a portion of a dynamoelectric generator 10 typically comprising a stator core 12 including a plurality of thin metallic laminations 14 stacked to form the core 12. The stator core 12 has a plurality of slots 16 therethrough spaced at equal intervals such as 2.0 inches to 3.5 inches around the inner diameter 18 of the core 12. Winding coil means 20 are positioned in the slot 16 as shown in FIG. 2. Each of the slots 16 at one end 22 thereof proximate the inner diameter 18 of the stator core 12 forms an air gap 24 for magnetic flux as is known in the art. The stator core 12 along opposite sides 26a, 26b of each of the slots 16 proximate the air gap end 24 have a groove 28 of predetermined shape, such as triangular, positioned a predetermined distance such as 0.125 inch from the air gap end 24 of each of the slots 16. A plurality of relatively thin non-metallic wedges 30 engage the grooves 28 for maintaining the winding coil means 20 positioned in the slot 16. The wedges 30 are made of Micarta, a Westinghouse Electric Corporation trademark, having the dimensions of 6 inches to 8 inches long, 0.75 inch to 1.375 inches high and 0.125 inch to 0.25 inch thick. Also typically included are spacers 34 that maintain a tight fit between the wedge 30 and the winding coil means 20. The generator described thus far is conventional.

The present invention provides a wedge removal saw apparatus 36 for a dynamoelectric generator 10 as shown in FIGS. 3–16C. The apparatus 36 comprises a circular saw means 38 for sawing each of the non-metallic wedges 30 into a plurality of wedge sections. Typically when sawing the wedges, the saw means divides the wedge into two half sections 40a and 40b as shown in FIG. 1. The circular saw means 38 includes base means 42. The saw means 38 may be a circular power saw which is manufactured by Black & Decker Model No. 3044-09.

Figure 4:
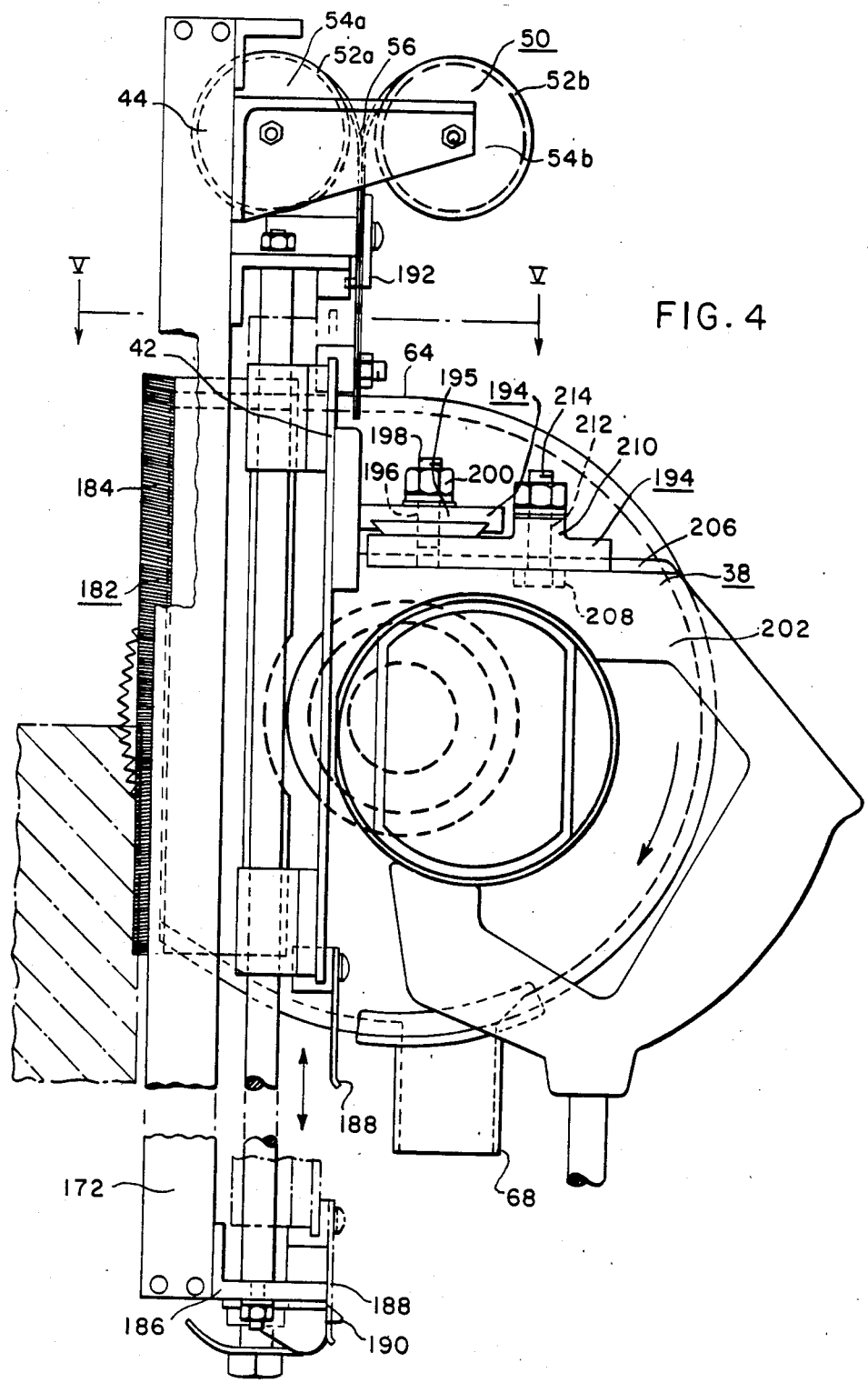
FIG. 4 is a side elevational view of the wedge means removal saw apparatus.
Figure 5:
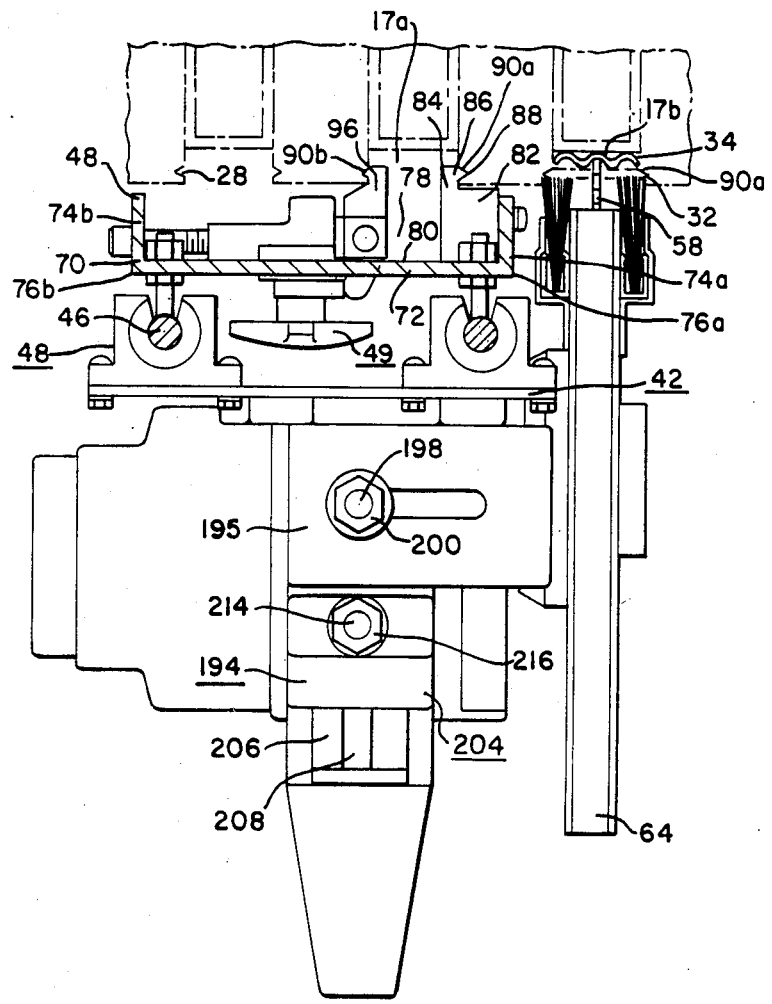
FIG. 5 is a cross-sectional taken along the line V—V of FIG. 4.
Figure 8:
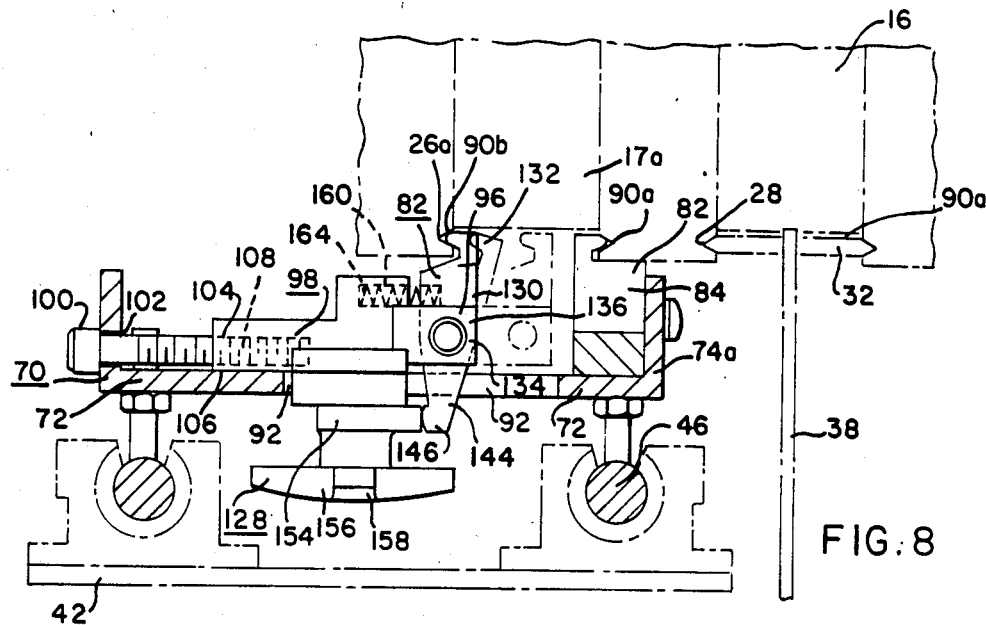
FIG. 8 is a sectional view of the channel member means showing the position of the clamp means.

The apparatus further comprises guide means 44 for supporting and guiding the circular saw means 38 along the wedges 30. The guide means comprises guide rod means 46. Support means 48 for supporting the guide rod means 46 as shown in FIG. 5. Clamp means 49 for clamping the support means 48 to the stator core grooves 28. The base means 42 rides on the guide rod means 46 as shown in FIG. 8. Preferably, a spring means 50 for counterbalancing the weight of the saw means during cutting of the wedge means 30 is provided. As shown in FIG. 4, the spring means 50 is mounted on the guide means 44. The spring means preferably includes a pair of springs 52a, 52b. Springs 52a, 52b may be negator extension springs, stainless steel number K12U100 0.012 thick by 2.0 wide by 100.0 long load 7.58 pounds as manufactured by Ametek of Hatfield, Pa. The springs 52a, 52b are housed on drums 54a, 54b and are supported by drum support 56 as shown in FIG. 4. Drums for support 56 is affixed to the guide means 44. The springs 52a, 52b engage the saw means 38.

The apparatus 36 also comprises power supply means 37 for providing power to the circular saw means 38.

The guide means 44 is positioned such that the clamp means 49 may engage the stator core grooves 28 in one of the slots 17a next to another of the slots 17b containing the wedge means 30 to be sawed as shown in FIG. 5. The saw means 38 is energized and the wedge means 30 is sawed. The plurality of wedge sections 40 formed by the wedges being sawed are removed from the grooves 28 of the other slot 17b.

Figure 3:
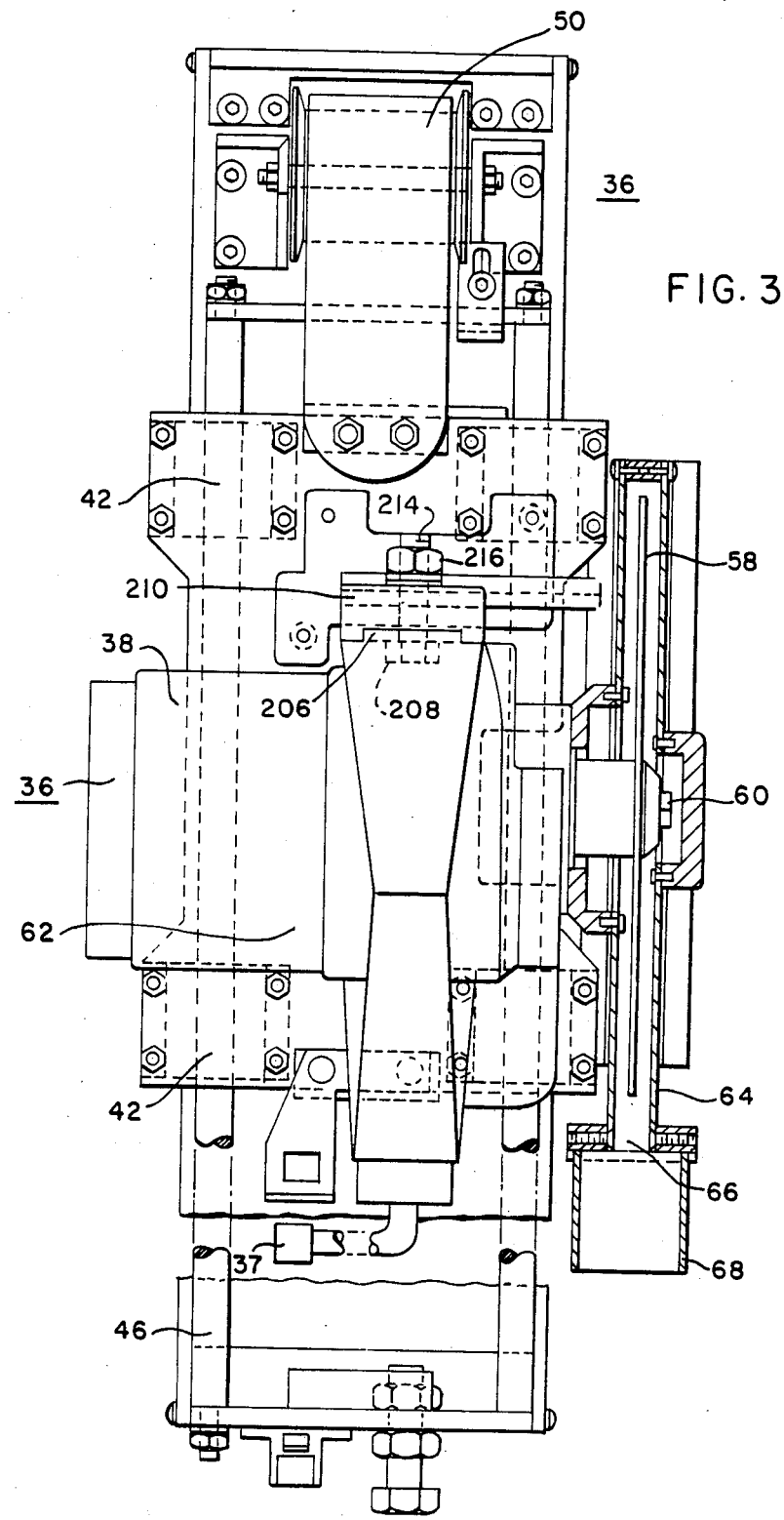
FIG. 3 is a plan view of the wedge means removal saw apparatus member.

Preferably, the circular saw means 38 comprises a circular saw blade 58. A first shaft 60 for supporting the saw blade 58. Motor means 62 affixed to the base member for driving the saw blade. As stated hereinbefore, the saw means 38 may be a conventional power saw. Preferably, the saw means 38 further comprises shroud means 64 substantially enclosing the saw blade 58 as is shown in FIGS. 3, 4 and 5. Preferably, the shroud 64 has a first opening 66 therethrough in predetermined position such as shown in FIGS. 3, 4 and 5. A vacuum port means 68 is affixed to said shroud means 64 at the first opening 66. This is desirably included so that a vacuum may be attached to the apparatus and a large portion of the material sawed will be directed into the vacuum.

Preferably, the support means 48 comprises a channel member means 70 of predetermined size such as 5 inches wide×1 inch high. The channel member means 70 has a central member 72 and lip members 74a, 74b positioned on opposite sides 76a, 76b thereof forming a channel 78 as shown in FIG. 5 of predetermined size such as 4.62 inches wide×0.81 inch deep on the bottom portion 80 of the channel member means 70.

Figure 10:
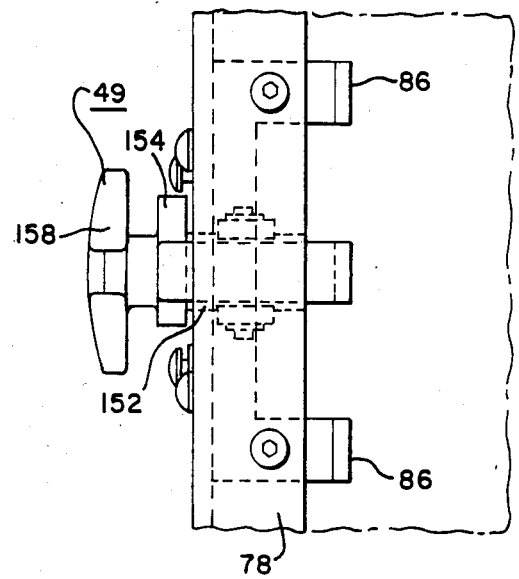
FIG. 10 is the side elevational view the clamp means.

Preferably, the clamp means 49 includes groove engagement means 82 comprising a fixed groove engagement member 84 mounted to said channel member means proximate one of the lip members 74a as shown in FIG. 5. The fixed groove engagement member 84 has a pair of first groove engagement jaw members 86 as shown in FIG. 10. Each of the first jaw members 86 has a first groove engagement portion 88 shaped to engage a first of the grooves 90a on the opposite side 26b of one of the slots 17a. The pair of first groove engagement jaw members 86 are positioned a predetermined distance from the saw blade 58 so as to engage the first groove 90a of one of the slots 17a next to another of the slots 17b containing the wedge means 30 to be sawed.

Figure 9:
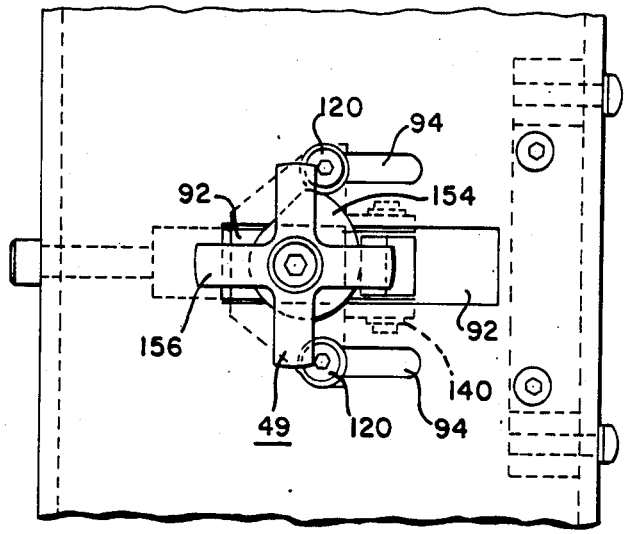
FIG. 9 is a plan view of the clamp means.

Preferably, the channel member means 70 includes a second opening 92 and third openings 94 therethrough in predetermined position as shown in FIG. 9.

Figure 11A:
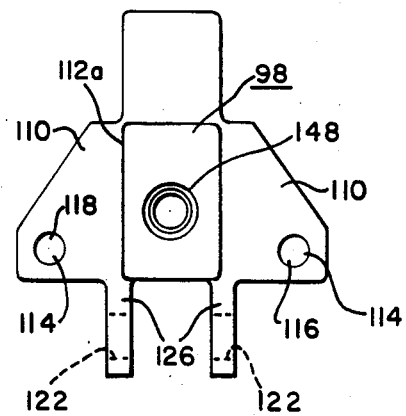
FIG. 11A is a plan view of the central holding member of the clamp means.
Figure 11B:
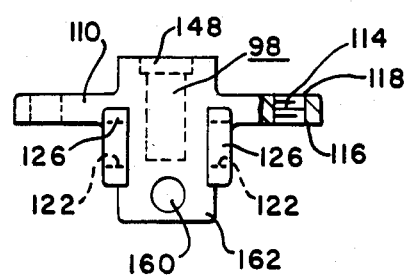
FIG. 11B is a side elevational view of the central holding member of the clamp means.
Figure 11C:
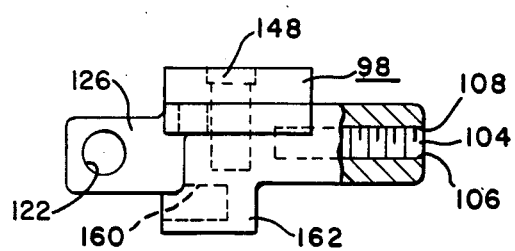
FIG. 11C is a front elevational view of the central holding member of the clamp means.

Preferably, the groove engagement means 82 further comprises a movable groove engagement member 96 comprising a central holding member 98 such as shown in FIGS. 11A, 11B, and 11C. The central holding member 98 is substantially housed within the channel 78 of the channel member means 70 and in predetermined alignment with the second opening 92 as shown in FIGS. 8, 9 and 10. A first adjustment bolt member 100 for adjusting the position of the movable groove engagement member 96 for various widths of the slots 16 is provided.

Preferably, the other of the lip members 74b of the channel member means 70 has a first aperture 102 therethrough in predetermined alignment with the central holding member 98 as shown in FIGS. 9 and 10. The central holding member 98 has a second aperture 104 therethrough of predetermined size such as 0.250 inch. The central holding member 98 around the periphery 106 of the second aperture 104 has first threading means 108. The first adjustable bold member 100 passes through the first aperture 102 of the one lip member 74b and engages the first threading means 108 of the central holding member 98.

Preferably, the central holding member 98 has first flange members 110 affixed to opposite sides 112a, 112b thereon. Each of the first flange members has a third aperture 114 therethrough. The first flange members 110 around the periphery 116 of the third apertures 114 has second threading means 118. Set screw means 120 are provided for engaging the first flange members 110. The set screw means 120 pass through the third openings 94 in the central member 72 of the channel member means 70 and engage the second threading means 118 of the first flange members 110.

Preferably, the central holding member 98 has second flange members 122 affixed to oppposite sides 112a, 112b of the central holding member 98. The second flange members 122 have fourth apertures 126 therethrough. The fourth apertures 126 are coaxially aligned as shown in FIG. 11B.

Preferably, the movable groove engagement member 96 further comprises a quick release means 128. The quick release means 128 includes a second groove engagement jaw member 130 having a second groove engagement portion 132 of predetermined size and shape to engage the second of the grooves 90b on the other opposite side 26a of the slot 17a as shown in FIGS. 5, 8. The second jaw member 130 has a fifth aperture 134 therethrough in predetermined position as shown in FIG. 8, which is located proximate the midportion 136 of the second jaw member 130. A second shaft member 138 passes through the fifth aperture 134 of the second jaw member 130 and the fourth apertures 126 of the second flange members 122. The second jaw member 130 is rotatably mounted on the second shaft member 138. Ring members 140 retain the second shaft member in position as shown in FIG. 9. Preferably, the second jaw member 130 has a top cam engagement portion 144 at the end 146 opposite said second groove engagement portion 132 as shown in FIG. 8. The top cam engagement portion 144 passes through the second opening 92 of the central member 72 of the channel member 70. The central holding member 98 has a sixth aperture 148 passing therethrough near the top 150 thereof. A third shaft member 152 passes through the second opening 92 in the central member 72 and is rotatably mounted in the sixth aperture 148. A cam means 154 is affixed to the third shaft member 152 above the central member 72. The cam engagement portion 144 of the second jaw member 130 engages the cam means 154. A knob member 156 is affixed to the top 158 of the third shaft 152. The central holding member 98 has a seventh aperture 160 therethrough proximate the bottom portion 162 thereof, as shown in FIG. 11B. A second spring means 164 engages the second jaw member 130 proximate the second groove engagement portion 132, whereby when the knob member 156 is turned, the clamp means 49 is quickly released from the grooves 28 of the stator core 12.

Figure 14A:
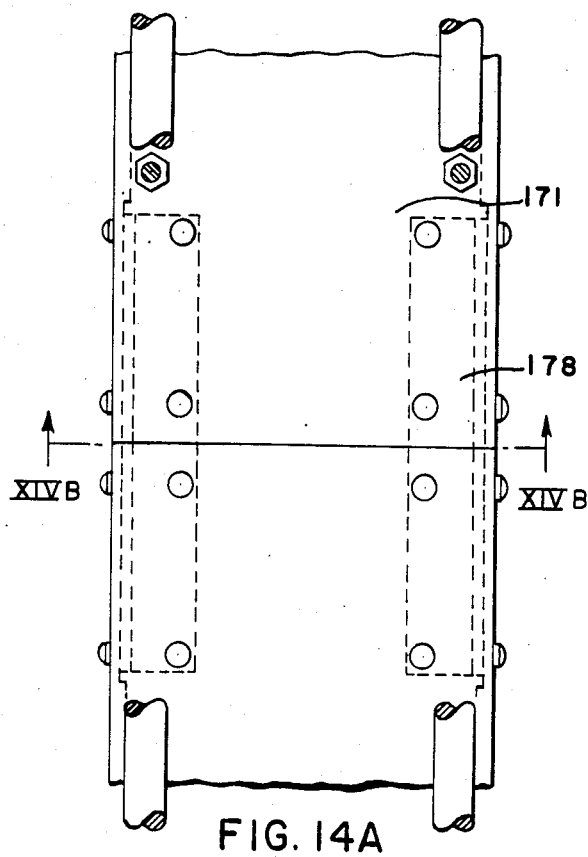
FIG. 14A is a front elevational view of a portion of the support means showing the jointure of two channel members.
Figure 14C:
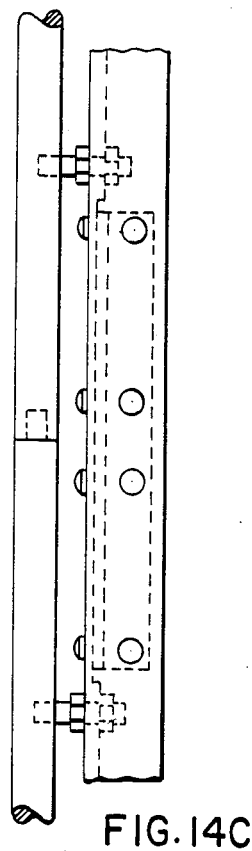
FIG. 14C is a side elevational view of the portion of the support means shown in FIG. 14A channel members.
Figure 14B:
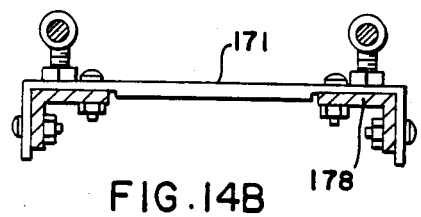
FIG. 14B is a cross-sectional view taken along the line XIVB—XIVB of FIG. 14A showing the joining means.

Preferably, the apparatus 36 further comprises an adjustable top-of-core stop member 166 that is mounted on one of the lip members 74a and includes second lip member 168 that is adjusted by set screws 170 to contact the top of the iron of the stator core 12 as shown in FIGS. 13A and 13B. Preferably, the channel member means includes a plurality of interconnecting channel members 171 as shown in FIGS. 6 and 7. Preferably, the interconnecting channel members 171 include a bottom section channel member 172, a middle section channel member 174 and a top section channel member 176. Preferably, the clamp means 49 is mounted to the bottom section channel member 174 and the top section channel member 176 and the middle section channel member 174 as shown in FIGS. 6, 7, 14A and 14B in predetermined position. Preferably, joining means 178 is included comprising a plurality of metallic angle members 180 that join the channel members 171 together as shown in FIGS. 14A, 14B and 14C.

In operation, the apparatus 36 is attached vertically to the grooves 90a, 90b of one of the slots 17a of the stator core 12 and is manually operated in the vertical direction preferably starting at the bottom of the core. The spring members 52a, 52b impart a constant tension and counterbalance the weight of the saw means 38 for ease and safety of operation. A vacuum cleaner is attached to the vacuum port to pick up any dirt and dust generated by the sawing operation. An adjustable brush assembly 182 is preferably mounted on each side of the shroud means 64 and brushes 184 are attached to the ends of the shroud to minimize the escape of dirt from the shroud 64. Movable groove engagement member 96 is adjusted initially for the width of the slot of the particular stator core 12. This is accomplished by loosening set screws 120 and adjusting bolt member 100, thus sliding the clamp means 49 in the third openings 94 to the proper position. Once the movable groove engagement member 96 has been set for the particular width slot, the knob member 156 of the quick release means 128 is all that needs to be turned to quickly release the clamp means from the slots 16. As can be seen in FIG. 1, the apparatus 36 is designed such that the clamp means 49 is in the one slot 17a and the saw blade 58 is operating in the other slot 17b next to the one slot 17a where the clamp means is engaging the grooves 28.

Also preferably included is bottom clamp means 186 shown in FIG. 4 which is part of the bottom section channel member 172. A function of the bottom clamp means is to lock the saw means 38 in place during transport from slot to slot. Catch lever 188 mounted on the saw means 38 engages catch 190 for transport. Also preferably included is top clamp means 192 as shown in FIG. 5 for holding the saw means 38 at the top of the top section channel 176 for transport to the generator 10.

With reference to FIGS. 3, 4 and 5, also desirably included is saw blade positioning means 194. Saw blade positioning means 194 includes first bracket 195 a horizontal adjustment slot 196 therethrough as shown in FIG. 4. First bracket 195 is affixed to the base plate 42. Bolt 198 and nut 200 are also included. The bolt 198 is slidable in horizonal adjustment slot 196. To adjust the position of the saw blade relative to the other slot 17b containing the wedge means to be removed, the nut 200 is simply loosened and the saw blade is aligned with the other slot 17b in the proper position. The saw blade positioning means 194 also includes depth of cut adjustment means 204. The depth of cut adjustment means 204 includes saw channel member 206 having a vertical adjustment slot 208. The saw channel member 206 is affixed to the saw housing 202. A second bracket 210 is included. Second bracket 210 has eighth aperture 212 passing therethrough. A second bolt 214 as shown in FIG. 5 passes through the eighth aperture 212. Second nut 216 is mounted on the second bolt 214 shown in FIGS. 3, 4 and 5. The head 208 of the second bolt 214 rides in the saw channel member 206. To adjust the depth of cut of the saw blade 58, second nut 216 is loosened and the saw may be adjusted to the proper depth. To adjust the depth of cut of the saw blade means for adjusting same are provided including second nut 204 which is loosened and the blade is set to the desired depth. The bottom section channel 172, middle section channel 174 and top section channel 176 make the apparatus capable of fitting or accommodating the full range of hydrogenerator slot sizes. For smaller generators, only the bottom section channel 72 and the top section channel 76 need be used. For larger generators, the middle section channel is also used.

We claim:

1. A wedge removal saw apparatus for a dynamoelectric machine, said machine comprising a stator core including a plurality of thin metallic laminations stacked to form said stator core, said stator core having a plurality of slots therethrough spaced at equal intervals around the inner diameter of the core, winding coil means positioned in said slot, each of said slots at one end thereof proximate the inner diameter of said stator core forming an air gap for magnetic flux, said stator core along opposite sides of each of said slots proximate said air gap end having a groove of predetermined shape positioned a predetermined distance from said air gap end of each of said slots, a plurality of relatively thin non-metallic wedges engageable in said grooves for maintaining said winding coil means in position in said slots, said apparatus comprising:

(a) circular saw means for sawing each of said non-metallic wedges into a plurality of wedge sections, said saw means including a base member means affixed to said saw means;

(b) guide means for supporting and guiding said circular saw means along said wedges, said guide means comprising guide rod means, support means for supporting said guide rod means; said support means comprising channel member means of predetermined size, said channel member means having a central member and lip members positioned on opposite sides thereof forming a channel of predetermined size on the bottom portion of said channel member means, clamp means for clamping said support means to said stator core grooves, said clamp means comprises groove engagement means housed substantially within said channel of said channel member means, said groove engagement means comprises a fixed groove engagement member mounted to said channel member means proximate one of said lip members, said fixed groove engagement member having a pair of first groove engagement jaw members, each of said first jaw members having a first groove engagement portion shaped to engage a first of said groove, on one of said opposite sides of one of said slots, and first groove engagement jaw members positioned a predetermined distance from said saw blade so as to engage said first groove of one of said slots next to another of said slots containing said wedge means to be sawed, said base means riding on said guide rod means; and (c) power supply means for providing power to said circular saw means, whereby when said guide means is positioned such that said clamp means may engage the stator core grooves in one of said slots next to another of said slots containing wedges to be sawed, when said saw means is energized and said wedges are sawed, a plurality of wedge sections are removed from said grooves of said other slot.

2. The apparatus of claim 1, wherein said channel member means has a second opening therethrough in predetermined position and of predetermined size and shape.

3. The apparatus of claim 2, further comprising a movable groove engagement member, said movable groove engagement member comprising a central holding member substantially housed within said channel member means and in predetermined alignment with said second opening, a first adjustment bolt member for adjusting the position of the movable groove engagement member for various widths of said slots.

4. The apparatus of claim 3, wherein one of said lip members of said channel member means has a first aperture therethrough in predetermined alignment with said central holding member, said central holding member has a second aperture therethrough of predetermined size, said central holding member around the periphery of said second aperture having first threading means, said first adjustable bolt member passing through said first aperture of said one lip member and engaging said first threading means of said central holding member.

5. The apparatus of claim 4, wherein said central holding member has first flange members affixed to opposite sides thereof, each of said first flange members has a third aperture therethrough, said first flange members around the periphery of said third aperture having second threading means, set screw means for engaging said first flange members, said set screw means passing through the third openings in said central members of said channel member means and engaging said second threading means of said first flange members.

6. The apparatus of claim 4, wherein said central holding member has second flange members affixed thereto, said second flange members affixed to opposite sides of said central holding member, said second flange members having fourth apertures therethrough, said fourth apertures being coaxially aligned.

7. The apparatus of claim 6 wherein said movable groove engagement member further comprises quick-release means including a second groove engagement jaw member having a second groove engagement portion of predetermined size and shape to engage a second of said grooves on the other of said opposite sides of said slot, said second jaw member having a fifth aperture therethrough in predetermined position, a second shaft member passes through said fifth aperture of said second jaw member and said fourth apertures of said second flange members, said second jaw member rotatably mounted on said second shaft member, said second jaw member having a top cam engagement portion at the end opposite said second groove engagement portion, said top cam engagement portion passing through said second opening of said central member of said channel member, said central holding member having a sixth aperture therethrough near the top thereof, a third shaft member passes through said second opening in said central member and is rotatably mounted in said sixth aperture, a cam means is affixed to said third shaft member above said central holding member, said cam engagement portion of said second jaw member engaging said cam means, a knob member affixed to the top of said third shaft, said central holding member having a seventh aperture therethrough proximate the bottom portion thereof, a second spring means mounted in said seventh aperture, said second spring means engaging said second jaw proximate said second groove engagement portion thereof, whereby when said knob member is turned said clamp means is quickly released from said grooves of said stator core.

* * * * *